April 18, 1933.    B. N. R. LAMONT    1,903,926
COUPLING FOR JOINING PIPES, RODS, WIRES, AND THE LIKE
Filed Oct. 13, 1930    2 Sheets-Sheet 1

INVENTOR.
BOYD NEIL ROBERT LAMONT.
ATTORNEY.

April 18, 1933.  B. N. R. LAMONT  1,903,926
COUPLING FOR JOINING PIPES, RODS, WIRES, AND THE LIKE
Filed Oct. 13, 1930   2 Sheets-Sheet 2

INVENTOR.
BOYD NEIL ROBERT LAMONT.
ATTORNEY.

Patented Apr. 18, 1933

1,903,926

UNITED STATES PATENT OFFICE

BOYD NEIL ROBERT LAMONT, OF FELTHAM, ENGLAND, ASSIGNOR TO SIMPLIFIX PATENTS LIMITED, OF TEDDINGTON, MIDDLESEX, ENGLAND, A REGISTERED COMPANY OF GREAT BRITAIN

COUPLING FOR JOINING PIPES, RODS, WIRES, AND THE LIKE

Application filed October 13, 1930, Serial No. 488,496, and in Great Britain October 21, 1929.

The improved coupling comprises two coupling members capable of being screwed or otherwise forced axially together and being each axially bored for a certain depth, these bores being of larger diameter than the diameters of the pipes or the like to be connected and being terminated at their inner ends by inwardly directed annular conical or cupped shoulders or seatings the inner diameters of which are sufficiently large to allow the pipes or the like to be connected to be passed therethrough. Within the bores of the coupling members is a free cylindrical metal sleeve or sleeves the edges of which when the coupling members are screwed or otherwise forced axially together will be spun or turned over by the compressing action of the conical shoulders and grip into the pipe or the like and form a tight joint.

The improved coupling allows of joining not only metal pipes but also rods, cables or similar bodies together or to other members, for instance in the case of metal or rubber pipes to T-pieces, cross pieces, valves, stopcocks, petrol tanks etc. and in the case of wires or cables to break controls, aeroplane parts, hooks, eyes and the like without the ends of the pipes, wires, cables or the like having to be screw threaded, machined, or prepared in any particular way thus saving much time and labour. The invention is also very suitable for joining rubber pipes.

With my improved coupling when used for pipes a perfectly gas or liquid-tight doublegrip joint can be effected with metal pipes having irregular surfaces or having slightly different external diameters; this also applies in the case of rods, wires, cables and the like wherein a connection capable of resisting great tensions and strains is provided.

Various examples of construction are illustrated in the annexed drawings in which, Fig. 1 illustrates in section a coupling joint for two pipes in line.

Figure 1:
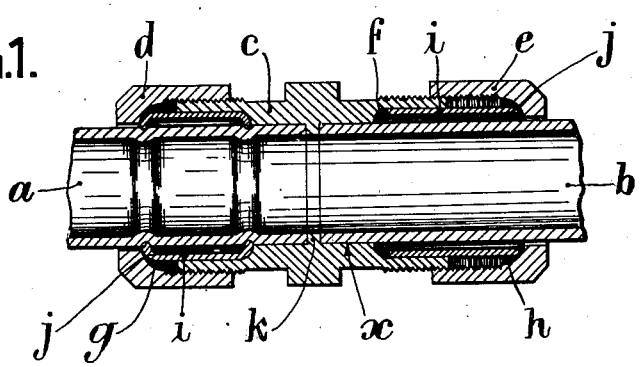

Referring to Fig. 1 the right hand half of which shows the coupling members before being screwed up and the left hand half after being screwed up.

$a$ and $b$ represent two pipes to be connected, the coupling member being here formed of an externally screw threaded union member $c$ and two coupling nuts $d$ $e$. The union $c$ is hollowed out at each end as at $f$ and the nuts $d$ and $e$ are also hollowed out, the bottoms or ends of these hollowings being provided respectively with seatings $g$ and $h$ cut to the radius of a circle.

Within the annular recesses or chambers formed by the nuts and union together are placed before the nuts are screwed on to the union, two relatively hard metal sleeves $i$ of simple cylindrical shape and of uniform thickness from end to end. The outer circumference of these metal sleeves should form an easy but close fit in the hollowed out portion of the union member $c$ as shown in the drawings to allow of proper centering and also to allow the curving over of the edges of their extremities by the curved seatings $g$ and $h$ when the nuts are tightened on the union.

The inner diameters of the sleeves are slightly larger than the outer diameter of the pipes so as to leave slight annular spaces $j$.

In the figure the union is shown with an internal flange $k$ against which the ends of the pipes $a$ and $b$ are shown abutting, but such flange is not essential as the ends of the pipes can abut against one another.

Part of the inner diameter of the union $c$ is preferably such that it forms a guide, as shown at $x$, for the outer diameter of the tubes $a$ and $b$.

The right half of the figure shows the sleeve $i$ before the nut $e$ has been tightened to curve over its ends to grip the pipe $b$ and the left hand of the figure shows the nut $d$ tightened up and two ends of the sleeve bent over to engage into the pipe $a$ with consequent shortening of the sleeve as shown.

When the nuts are tightened the curved shoulders have a spinning action on the ends of the sleeves $i$ and progressively turn or curve over the edges which will dig into the peripheries of the pipes and produce a fluid tight joint at each end of the sleeve thus producing a double joint. This double joint not only forms an effectual safeguard against leakage but also owing to the grip of the sleeve operating on two places on the pipe surface, it prevents any axial deflection of the pipe with respect to the coupling device.

Figure 2:
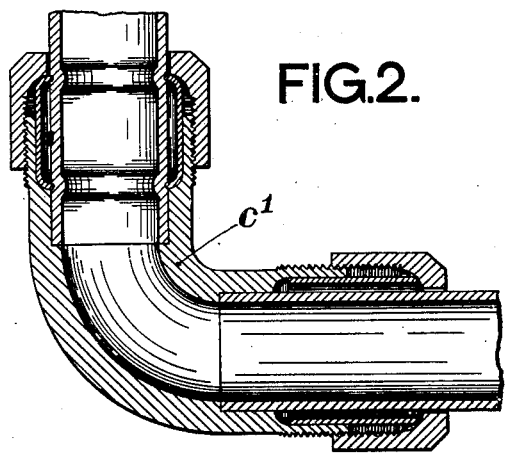
Fig. 2 illustrates also in section an elbow coupling for two pipes.

Fig. 2 illustrates the coupling shown in Fig. 1 in the form of an elbow joint the part in the horizontal position in the drawings showing the joint before tightening and the part in vertical position after tightening. In this case the union member $c^1$ is bent at a right angle as shown otherwise the parts of the coupling are identical in shape and section to those shown in Figure 1 and need no further description.

Figure 3:
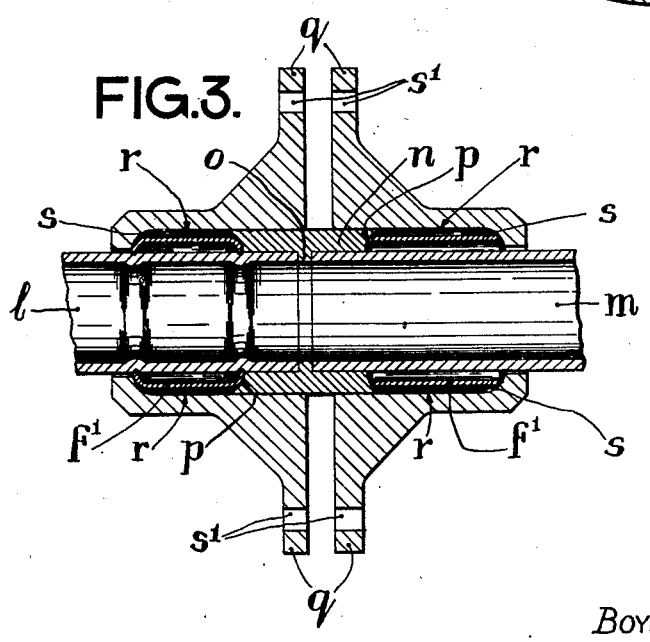
Fig. 3 is a section of a flange coupling suitable for pipes of large diameter.

Fig. 3 illustrates the invention applied to pipes of larger diameter to be connected by means of flanges.

In this case the ends of the pipes $l$ and $m$ are inserted in a ring $n$ provided with a central flange $o$ and having its ends or edges curved to form the shoulders or seatings as at $p$, the connecting flanges $q$ being bored out as at $r$ to fit over the outer surface of the ring $n$ the inner ends of said bores being provided with curbed shoulders or seatings $s$. In the space between the shoulders $p$ and $s$ the sleeves $f^1$ are fitted in a similar manner to that described with reference to Fig. 1 and when the flanges $q$ are forced together by means of bolts passing through the holes $s^1$ the ends of the sleeves $f^1$ are bent over and engage into the pipes and form a tight joint as shown in the left half of the figure.

When fitting the outer surface of the ring $n$ serves as a guide for the flanges $q$ as they are drawn together thus providing for accurate centering and guiding of the flanges.

Figure 4:
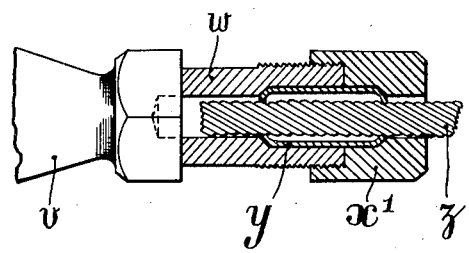
Fig. 4 shows in section the method of coupling a hook or the like to a wire rope.
Figure 5:
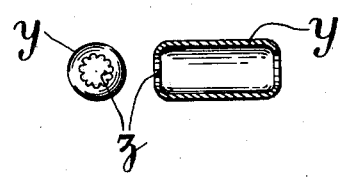
Fig. 5 illustrates the sleeve in Fig. 4 after compression.

Figs. 4 and 5 illustrate the invention applied to the joining of an eye or the like to a wire cable.

To an eye or the like $v$ is fixed the externally threaded union member $w$ on which is screwed the nut $x^1$ the ends of the cut away portions of the union member and the nut being formed as the curved seatings as in Fig. 1 which turn over the edges of the cylindrical sleeve $y$ to engage the wire $z$ as in Figure 1.

The ends of the sleeve $y$ become serrated as shown at $z$ in Fig. 5 when the nut $x$ is tightened by being forced onto the strands of the cable. The left hand portion of this figure shows these serrations which effect a firm grip on the cable without cutting through the strands of the cable and owing to the twists of the strands effectually prevent the cable being pulled out of the coupling members.

Figure 6:
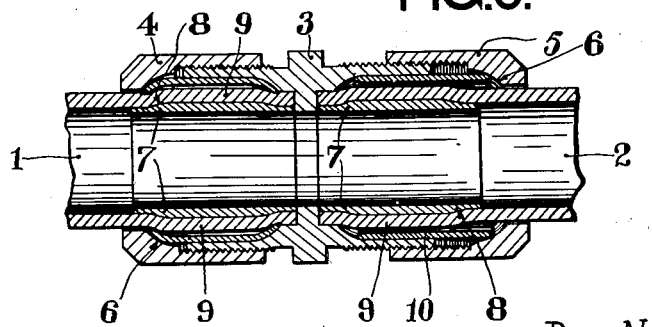
Fig. 6 is a section illustrating the coupling illustrated in Fig. 1 applied to the connection of two rubber pipes such for instance as are used for pneumatic drills.

Fig. 6 illustrates the invention applied to rubber pipes.

The two rubber pipes 1 and 2 are here shown joined by a coupling member similar to that shown in Fig. 1 and comprising the union 3 and the nuts 4 and 5.

In this case the shoulders 6 would be of flatter curvature as shown. I first insert in each pipe end a metal liner 7 the outer diameter of which has a sweeping curve 8 from end to end as shown and this has the effect of producing a similar bulging of the rubber pipes as at 9.

Owing to the flat curvature of the shoulders 6, when the nuts are screwed up the ends of the sleeve are compressed into the rubber pipe sufficiently to provide a tight joint as shown in the left hand portion of the figure the pipe being pressed against the liner 7. In the figure for the sake of clearness of the drawings a slight space 10 is shown between the inner diameter of the sleeve and the outer diameter of the rubber pipe but in practice this would not be present the whole inner length of the sleeve being forced against the rubber pipe, thus providing an absolutely sound and fluid-tight joint.

For tubings used for containing electrical wires for lighting or other purposes the sleeve may be serrated on its inner surface or edges, these serrations when the coupling is tightened operating to break up the enamel with which such tubes are coated and thus provide continuity of the tubing for earth return.

Modifications of this device, described, claimed and illustrated in the original application, are the basis of a divisional application, Serial No. 653,877, filed January 27, 1933.

What I claim as my invention and desire to secure by Letters Patent of the United States is:—

1. A coupling comprising in combination a pair of constraining members adapted for surrounding the element to be coupled and hollowed out to receive a straight cylindrical metal sleeve, said sleeve being a close fit within said members but adapted to be a loose fit on the said element, means for drawing said members together axially, a pair of oppositely-bevelled internal surfaces one on each member and arranged such that on said members being drawn axially together each end of said sleeve is forced down the respective bevelled surface to grip the element and at the same time axially shorten the said sleeve.

2. A coupling for flexible hose comprising in combination with an end of hose, a pair of constraining members adapted for surrounding said hose end and hollowed out to receive a straight cylindrical metal sleeve, said sleeve being a close fit within said members but adapted to be a loose fit on the hose, a metal liner positioned within said hose end and adapted to be a close fit therein, said liner having a sweeping outward curve to bulge said hose end outwardly, means for drawing said constraining members together axially, a pair of oppositely-bevelled internal surfaces one on each member, the parts being proportioned and positioned such that each end of said sleeve is adapted on said constraining members being drawn axially together to be forced down the respective bevelled surface to grip said hose, said bulged hose end being adapted to follow the internal contour of said deformed sleeve and thereby make a fluid-tight joint therebetween.

3. A coupling for pipes and like elements as defined by claim 1, wherein the bevelled internal surface on each constraining member forms part of a sphere.

BOYD NEIL ROBERT LAMONT.